US012775643B1

(12) United States Patent
Turner

(10) Patent No.: US 12,775,643 B1
(45) Date of Patent: Oct. 27, 2026

(54) ELECTRONIC DOCUMENT OBJECT LABELING USING COMMUNITY DATA

(71) Applicant: Docusign, Inc., San Francisco, CA (US)

(72) Inventor: Mariam Badiei Turner, Charlotte, NC (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/759,174

(22) Filed: Jun. 28, 2024

(51) Int. Cl.
*G06F 16/332* (2025.01)
*G06F 16/334* (2025.01)
*G06F 16/35* (2019.01)

(52) U.S. Cl.
CPC ...... *G06F 16/3323* (2019.01); *G06F 16/3347* (2019.01); *G06F 16/35* (2019.01)

(58) Field of Classification Search
CPC ... G06F 16/3323; G06F 16/3347; G06F 16/35
See application file for complete search history.

(56) References Cited

U.S. PATENT DOCUMENTS

2018/0253409 A1* 9/2018 Carlson ................. G06F 40/205
2022/0035990 A1* 2/2022 Kaza ...................... G06F 40/131
2022/0035993 A1* 2/2022 Bhandarkar .......... G06F 40/169
2022/0207429 A1* 6/2022 Haribhakti .............. G06F 16/35
2022/0253871 A1* 8/2022 Miller ..................... G06F 16/36
2023/0029752 A1* 2/2023 Szuchmacher ....... G06F 40/186
2023/0064367 A1* 3/2023 Satish ..................... G06F 16/93
2023/0385966 A1* 11/2023 Hegardh ................ G06Q 50/18
2024/0012842 A1* 1/2024 Kislal ................. G06F 16/3347
2024/0275817 A1* 8/2024 Grout .................. H04L 63/1425
2025/0348741 A1* 11/2025 Rimchala ................ G06N 3/09

OTHER PUBLICATIONS

Laujan et al., "What is Azure AI Document Intelligence?", Ai Skills Challenge, Aug. 28, 2024, 21 pp., https://learn.microsoft.com/en-us/azure/ai-services/document-intelligence/overview?view=doc-intel-4.0.0.
Superannotate, "30 best data labeling tools [2024 Q3 Updated]", SuperAnnotate AI, Inc., Aug. 19, 2024, 34 pp., URL: https://www.superannotate.com/blog/best-data-labeling-tools.
Venturebeat, "The vector database is a new kind of database for the AI era", VentureBeat, Dec. 24, 2022, 7 pp., URL: https://venturebeat.com/data-infrastructure/the-vector-database-is-a-new-kind-of-database-for-the-ai-era/.

* cited by examiner

*Primary Examiner* — Courtney Harmon
(74) *Attorney, Agent, or Firm* — Shumaker & Sieffert, P.A.

(57) ABSTRACT

Techniques are described for a system configured to label objects of electronic documents using a plurality of user devices. The system may determine an agreement type object for an electronic document. The system may determine, based on the agreement type object, a set of possible labels for the electronic document. The system may determine, based on the set of possible labels, a preliminary label for the agreement type object. The system may receive, from the plurality of user devices, community data including at least an indication that the preliminary label is approved. The system may generate approval state information for the preliminary label based on the community data. The system may output, based on the approval state information for the preliminary label, the preliminary label, and content of the agreement type object.

20 Claims, 6 Drawing Sheets

ELECTRONIC DOCUMENT OBJECT LABELING USING COMMUNITY DATA

TECHNICAL FIELD

This disclosure relates generally to electronic document management.

BACKGROUND

Artificial intelligence for electronic document management applications uses a large amount of training data to train machine learning models to perform specific tasks related to electronic document management. Training data may include sample electronic documents that have been manually labeled based on information included in the sample electronic documents.

SUMMARY

Aspects of the present disclosure describe techniques for automatically labeling objects of electronic documents using community data received from user devices. An electronic document management platform may be a computing system configured to automatically label objects (e.g., clauses of a contract) of electronic documents using community data. The electronic document management platform may apply natural language processing (NLP) techniques, latent semantic indexing/analysis (LSI/LSA) techniques, or the like to determine objects of electronic documents included in a document dataset. Objects of electronic documents may include data structures (e.g., strings, integers, double data types, floating values, etc.) that represent chunks of information associated with various categories or attributes of electronic documents, such as agreement types (e.g., master service agreement, statement of work, lease agreements, etc.) associated with electronic documents, objective information (e.g., price terms, contracting party information, etc.), clauses (e.g., warranty clauses, force majeure clauses, governing law clauses, etc.), and/or other attributes associated with characteristics of electronic documents (e.g., consideration of an agreement, implied terms of an agreement, etc.). For example, the electronic document management platform may determine a first object of an electronic document as a string representing an agreement type of the electronic document, a second object of the electronic document as a double data type representing a price term of the electronic document, and/or a third object of the electronic document as a string representing a clause of the electronic document.

The electronic document management platform may determine a set of possible labels for an electronic document based on an agreement type associated with the electronic document. For example, the electronic document management platform may determine, based on a determined object of an electronic document representing an agreement type of the electronic document, a set of possible labels that are mapped to the agreement type. The set of possible labels may be predefined and mapped to agreement types based on labeling criteria associated with machine learning models to be trained using the set of possible labels.

The electronic document management platform may determine, based on the set of possible labels, a preliminary label for each object of an electronic document. The electronic document management platform may apply NLP or LSI/LSA techniques to determine a preliminary label for an object of an electronic document. For example, the electronic document management platform may analyze contextual meaning of data (e.g., strings) included in an object (e.g., an object representing text of a clause of the electronic document) to determine a label of the set of possible labels as the preliminary label. The electronic document management platform may generate data for a graphical user interface to include the preliminary label and data included in the object associated with the preliminary label. For example, the electronic document management platform may generate data for a graphical user interface to include a preliminary label for a clause of an electronic document and the text included in the clause.

The electronic document management platform may output data for the graphical user interface to user devices accessing content of the electronic document management platform. For example, based on receiving a request from a user device to access an electronic document managed by the electronic document management platform, the electronic document management platform may output, to the user device, data for the requested electronic document, as well as data for the graphical user interface that includes a preliminary label and data of an object associated with the preliminary label. The document management platform may output data for the graphical user interface in a non-obtrusive manner such that the user operating the user device may still view the requested electronic document.

The electronic document management platform may obtain an indication of whether a preliminary label for an object of an electronic document is approved. For example, the electronic document management platform may obtain, from a user device, an indication that a preliminary label for an object is approved. The electronic document management platform may assign points to a user account associated with the user device based on obtaining the indication. In this way, the electronic document management platform may incentivize users to interact with graphical user interfaces that include preliminary labels and corresponding data of objects associated with the preliminary labels. The electronic document management platform may generate training data based on the indications of whether preliminary labels are approved. For example, the electronic document management platform may generate training data, based on the indication specifying a preliminary label is approved, to include data comprising at least an indication of the preliminary label and an indication of the object. The electronic document management platform may additionally, or alternatively, implement a peer-review process to verify, prior to generating the training data, whether indications of whether preliminary labels are approved are accurate. The electronic document management platform may output the training data to a training platform for training one or more machine learning models for electronic document applications.

The techniques described herein may provide one or more technical advantages that realize one or more practical applications. For example, the electronic document management platform, in accordance with the techniques described herein, may generate labels for objects of electronic documents with a higher accuracy than systems that generate labels without community data. In general, manual data labeling of entire electronic documents is time consuming, user intensive, and may be subject to user error, due to, for example, fatigue of the human being manually labeling all clauses in an electronic document. The electronic document management platform, according to the techniques described herein, may, for example, determine a preliminary label in a consistent manner, which helps to reduce a burden of review by human beings. Inconsistent or inaccurate labels in training data may depreciate the quality of training of a machine learning model; thereby, reducing performance quality of the machine learning model. The electronic document management platform may further improve the quality of document management functionality performed by machine learning models by helping to manage a verification process to even further improve the accuracy and consistency of labeling electronic document objects.

In some systems, data labeling techniques may be limited to specific users with access to a system that trains and/or executes machine learning models for document management applications. However, the electronic document management platform, according to the techniques described herein, may distribute the verification process of preliminary labels across many user devices that interact with the electronic document management platform via a software application client, for example. The electronic document management platform may distribute the verification process by generating data for graphical user interfaces to request approval of preliminary labels from many users operating user devices interacting with the electronic document management platform. The electronic document management platform may assign point values and help to manage an approval hierarchy to incentivize users to participate in approving preliminary labels and/or improve accuracy of labels applied to electronic documents included in training data. For example, the electronic document management platform may adjust point values of user accounts based on responses to requests to approve or verify preliminary labels. In this way, users of user devices may be more likely to confirm and/or validate preliminary labels than systems that do not use point values, which may further improve the accuracy of labeling. The electronic document management platform may efficiently label electronic documents for training data at scale by distributing approval and verification responsibilities across user devices and allocating point values to user accounts associated with the user devices, based on approvals and verifications, to incentivize users to provide a greater amount of feedback on preliminary labels.

In one example, a system comprises processing circuitry and computer readable media comprising instructions that, when executed, cause the processing circuitry to determine an agreement type object for an electronic document. The instructions may further cause the processing circuitry to determine, based on the agreement type object, a set of possible labels for the electronic document. The instructions may further cause the processing circuitry to determine, based on the set of possible labels, a preliminary label for the agreement type object. The instructions may further cause the processing circuitry to receive, from a plurality of user devices, community data including at least an indication that the preliminary label is approved. The instructions may further cause the processing circuitry to generate approval state information for the preliminary label based on the community data. The instructions may further cause the processing circuitry to output, based on the approval state information for the preliminary label, the preliminary label, and content of the agreement type object.

In another example, a method may include determining an agreement type object for an electronic document. The method may further include determining, based on the agreement type object, a set of possible labels for the electronic document. The method may further include determining, based on the set of possible labels, a preliminary label for the agreement type object. The method may further include receiving, from a plurality of user devices, community data including at least an indication that the preliminary label is approved. The method may further include generating approval state information for the preliminary label based on the community data. The method may further include outputting, based on the approval state information for the preliminary label, the preliminary label and content of the agreement type object.

In yet another example, computer-readable storage media encoded with instructions that, when executed, causes processing circuitry of a computing system to determine an agreement type object for an electronic document. The instructions may further cause the processing circuitry to determine, based on the agreement type object, a set of possible labels for the electronic document. The instructions may further cause the processing circuitry to determine, based on the set of possible labels, a preliminary label for the agreement type object. The instructions may further cause the processing circuitry to receive, from a plurality of user devices, community data including at least an indication that the preliminary label is approved. The instructions may further cause the processing circuitry to generate approval state information for the preliminary label based on the community data. The instructions may further cause the processing circuitry to output, based on the approval state information for the preliminary label, the preliminary label and content of the agreement type object.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

Like reference characters denote like elements throughout the text and figures.

DETAILED DESCRIPTION

Figure 1:
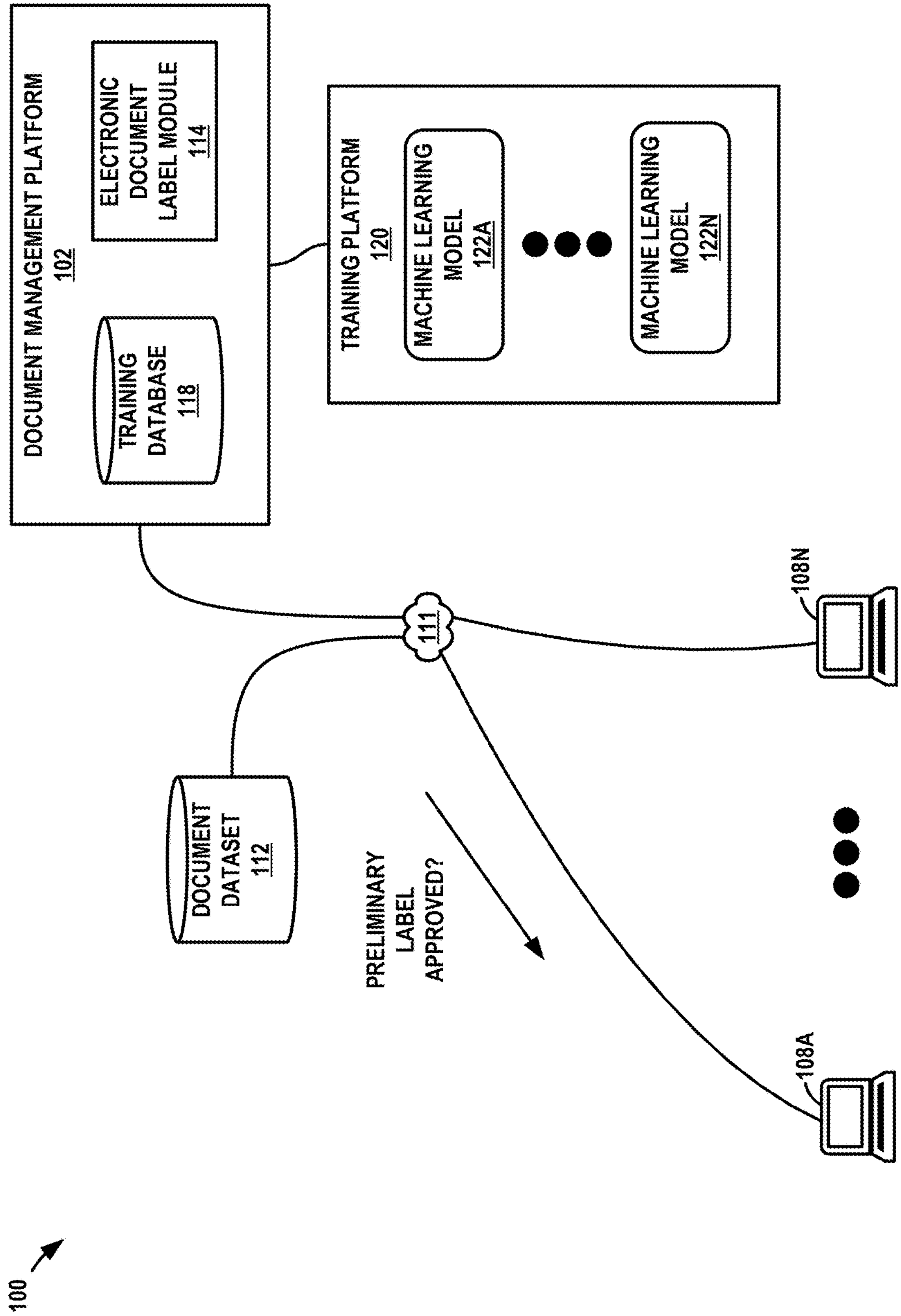
FIG. 1 is a block diagram illustrating an example computing environment for labeling electronic documents, in accordance with the techniques of this disclosure.

Data labeling may be important for training artificial intelligence applications that perform document management functionality. Generally, performance of machine learning models in artificial intelligence applications may be improved with a large volume of labeled training data used to train the machine learning models. Data labeling is relatively time consuming, manually intensive, and limited to users with access to the system managing the labeling of training data items. Handbooks for data labeling may be misunderstood on a regular basis (e.g., based on an expertise of the data labeler), which may result in mislabeled electronic document objects, misunderstood guidelines, or the like. Inaccuracies or inconsistencies in data labeling can result in performance issues of machine learning models trained with the inaccurate or inconsistent data labels. The techniques described herein may include for a relatively untrained generative machine learning model to determine preliminary labels for mass amounts of electronic documents, present the preliminary labels to user devices to confirm or deny the preliminary label, provide some incentive (e.g., digital point values, leader boards, etc.) for community driven confirmation of preliminary labels, provide a verification process (e.g., using peer review or peer confirmation to ensure preliminary labels are generally agreed upon by the community), and/or use community data including indications of whether preliminary labels are approved or verified to refine baseline models and create more finely tuned extractions on top of the baseline model.

The techniques described herein may include, for example, applying optical character recognition (OCR) techniques to unstructured data of electronic documents to convert the electronic documents into computer-readable data. For example, the techniques may apply OCR techniques to structure data included in obtained publicly available documents, from Electronic Data Gathering, Analysis, and Retrieval (EDGAR) for example, purchased documents, or customer documents. The techniques may divide the newly structured documents into rough categories based on agreement type and other relevant factors. For example, the techniques may apply a vector space of a vector database to categorize, based on agreement type, chunks of information in an electronic document. The techniques may additionally, or alternatively, apply a generative machine learning model to determine preliminary labels for categories or objects determined from the newly structured data. The techniques may present categories and/or preliminary labels determined for an electronic document to user devices via a clean, straightforward user interface. For example, the techniques may present a determined category and preliminary label for an electronic document by outputting, in a graphical user interface displayed by a user device, language corresponding to the preliminary label (e.g., content of a chunk of information included in the electronic document), a question asking whether the preliminary label accurately reflects the language, and an option for a user operating the user device to select a response of whether to confirm or deny accuracy of the preliminary label. The techniques may allow the user operating the user device to input a manual label to replace the preliminary label as a label for language corresponding to the preliminary label. In some instances, the techniques may present graphical user interfaces requesting approval or denial of a preliminary label as an unobtrusive textbox with selectable options to approve and/or deny as a thumbs up icon and/or a thumbs down icon, respectively.

Based on receipt of an initial approval or denial of a preliminary label, the techniques may include a pipeline for the preliminary label to be peer reviewed by others. For example, the techniques may include a community-driven, community-sourced labeling peer-review scheme, which may seamlessly be built into existing document management platforms. The techniques may apply peer-reviewed data labels to train machine learning models to perform document management functionality, such as classifying document types, distinguishing documents, recognizing document fields, or the like.

In some examples, the techniques may build models that nest into other models. For example, the techniques may include fine tuning a first machine learning model, using community-driven labeling as discussed above, to identify all contract values within electronic documents. The techniques may implement the peer review pipeline to ensure that labels are accurate, and labels were not missed. The techniques may apply a second machine learning model to the electronic documents to split up, based on the output of the first machine learning model, the documents before continuing the label the electronic documents. For example, the second machine learning model may be a contract type model associated with lease agreements or a contract type model associated with licensing agreements. The second machine learning model may determine preliminary labels for electronic documents based on the second machine learning model being fine-tuned to determine preliminary labels for a specific contract type (e.g., lease agreements, license agreements, etc.) The techniques may include additional machine learning models that determine preliminary labels based on outputs of the second machine learning model. For example, in instances where the second machine learning model is a lease type model, the techniques may include a third machine learning model, a fourth machine learning model, and a fifth machine learning model that determine preliminary labels specifically directed to monthly rent, annual rent, and total rent, respectively.

In another example, in an example where the second machine learning model is a licensing agreement model, the techniques may include a third machine learning model, a fourth machine learning model, and a fifth machine learning model to determine preliminary labels specifically directed to monthly licensing cost, yearly license cost, and total license cost, respectively. In general, the techniques may apply feedback of preliminary labels to fine tune machine learning models and implement additional machine learning models to determine granular preliminary labels based on machine learning models that have been fine-tuned based on an agreement types or other criteria. While the data generated using community data in the above example is training data for machine learning, in some examples, the data generated using community data may be used for other processes, such as for document management.

FIG. 1 is a block diagram illustrating example computing environment 100 for labeling electronic documents, in accordance with the techniques of this disclosure. In the example of FIG. 1, computing environment 100 includes document management platform 102, training platform 120, document dataset 112, user devices 108A-108N (collectively referred to herein as, "user devices 108"), and network 111. Document management platform 102 may provide storage and management of documents or document packages for users associated with user devices 108. Document management platform 102 may include a collection of hardware devices, software components, and/or data stores that can be used to implement one or more applications or services provided to user devices 108 via network 111. Document management platform 102 may be configured to allow users of user devices 108 to create and send documents to one or more recipients for negotiation, collaborative editing, electronic execution (e.g., electronic signature), automation of contract fulfillment, archival, and analysis, among other tasks.

Document management platform 102 may be implemented within a centralized document system, an online document system, a document management system, or any type of digital management platform. Example environments for document management platform 102 may include, but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Document management platform 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, healthcare software, or other types of applications or services. The applications or services may be provided as a service (-aaS) for Software-aaS, Platform-aaS, Infrastructure-aaS, Data Storage-aas (dSaaS), or other type of service.

Document management platform 102 may allow user devices 108 to access documents, via network 111 using a communication protocol, as if such document was stored locally (e.g., to a hard disk of a corresponding user devices 108). Example communication protocols for accessing documents and objects may include, but are not limited to, Server Message Block (SMB), Network File System (NFS), or AMAZON Simple Storage Service (S3).

Network 111 may include the Internet and/or may include or represent any public or private communications network or other network. For instance, network 111 may be a cellular network, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 111 using any suitable communication techniques. Network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1 may be operatively coupled to network 111 using one or more network links. The links coupling such devices or systems to network 111 may be Ethernet, Asynchronous Transfer Mode (ATM) or other types of network connections, and such connections may be wireless and/or wired connections. One or more of the devices or systems illustrated in FIG. 1 or otherwise on network 111 may be in a remote location relative to one or more other illustrated devices or systems.

Data exchanged over network 111 may be represented using any suitable format, such as hypertext markup language (HTML), extensible markup language (XML), or JavaScript Object Notation (JSON). In some aspects, network 111 may include encryption capabilities to ensure the security of documents. For example, encryption technologies may include secure sockets layers (SSL), transport layer security (TLS), virtual private networks (VPNs), and Internet Protocol security (IPsec), among others.

Examples of user devices 108 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), etc. In some examples, user devices 108 may represent a cloud computing system that provides one or more services via a network. That is, in some examples, user devices 108 may be a distributed computing system.

In an example, users of user devices 108 may represent an individual user, group, organization, or company that is able to interact with document packages (or other content) generated on or managed by the document management platform 102. Each user may be associated with a username, email address, full or partial legal name, or other identifier that may be used by the document management platform 102 to identify the user and to control the ability of the user to view, modify, execute, or otherwise interact with document packages managed by the document management platform 102. In some aspects, users may interact with the document management platform 102 through a user account with the document management platform 102 and one or more user devices accessible to that user. In situations in which document management platform 102 stores and uses information of users operating user devices 108, document management platform 102 may request explicit permission from the users prior to storing and using any personally identifiable information of the users.

Training platform 120 may include a collection of hardware and software components configured to train machine learning models for electronic document management applications. Training platform 120, in the example of FIG. 1, may include machine learning models 122A-122N (collectively referred to herein as, "machine learning models 122"). Machine learning models 122 may include computer readable instructions for applying machine learning models for electronic document management applications. Training platform 120 may use a large amount of labeled training data to effectively train machine learning models to perform document management functionality, such as classifying documents, distinguishing between documents, recognizing fields of documents, or the like. Labeling electronic documents to include in training data may be manually intensive and subject to user error. Document management platform 102, according to the techniques described herein, may automatically label electronic documents and manage an approval process for the labels to generate a large amount of training data for machine learning models 122, at scale.

In accordance with the techniques described herein, document management platform 102 may label electronic documents included in document dataset 112. Document dataset 112 may include a corpus of sample electronic documents that may be used as training data for one or more machine learning models 122 of training platform 120. In some instances, document dataset 112 may include sample electronic documents that have been downloaded from the internet, e.g., from servers hosting publicly available sample electronic documents (e.g., EDGAR) or purchased documents. In some examples, document dataset 112 may include sample electronic documents uploaded from any of user devices 108 and/or document management platform 102. In the example of FIG. 1, document management platform 102 may obtain document dataset 112 via network 111. Document management platform 102 may additionally, or alternatively, locally store document dataset 112 based on sample electronic documents a user of document management platform 102 and/or users of user devices 108 have uploaded for labeling.

Electronic document label module 114 of document management platform 102 may process electronic documents of document dataset 112 to determine objects for each of the electronic documents. Electronic document label module 114 may perform text recognition (e.g., optical character recognition) to structure data included in electronic documents of document dataset 112. Electronic document label module 114 may determine objects for an electronic document as data structures (e.g., strings, integers, double data types, floating values, etc.) that represent chunks of information associated with various categories or attributes of electronic documents, such as agreement types (e.g., master service agreement, statement of work, lease agreements, etc.) associated with electronic documents, objective information (e.g., price terms, contracting party information, etc.), clauses (e.g., warranty clauses, force majeure clauses, governing law clauses, etc.), and/or other attributes associated with characteristics of electronic documents (e.g., consideration of an agreement, implied terms of an agreement, etc.). For example, electronic document label module 114 may determine an agreement type object of an electronic document as a lease agreement, a price term object of the electronic document as the monthly rate specified in the lease agreement, a landlord object of the electronic document as a name of the landlord, a tenant object of the electronic document as a name of the tenant, a first clause object of the electronic document as text from a first clause of the electronic document, a second clause object of the electronic document as text from a second clause of the electronic document, and so on.

Electronic document label module 114 may determine a set of possible labels for an electronic document based on an agreement type associated with the electronic document. Electronic document label module 114 may determine the set of possible labels for an electronic document based on an agreement type object that may have been determined as an object of an electronic document. Electronic document label module 114 may store a mapping of sets of possible labels to corresponding agreement types based on attributes or characteristics specific to the corresponding agreement types. For example, electronic document label module 114 may store a mapping of an agreement type of a lease agreement to a set of possible labels that may include lease type, length of the lease, landlord name, tenant name, property information, tenant restrictions, or the like. Electronic document label module 114 may store possible labels that correspond to a hierarchical, tiered data-labeling scheme that organizes possible labels into tiers based on a hierarchy of characteristics or attributes (e.g., agreement type, clause type, etc.) associated with electronic documents of document dataset 112.

In some instances, electronic document label module 114 may determine the set of possible labels based on a mapping of an agreement type object of an electronic document to a cluster generated and managed by a vector database of document label module 114. For example, electronic document label module 114 may include a vector database that includes embeddings or vectors mapped to a multi-dimensional vector space, where each dimension corresponds to characteristics or attributes associated with agreement type objects. Electronic document label module 114 may generate clusters of sample electronic documents by generating embeddings for the sample electronic documents and mapping the embeddings to the vector space of the vector database. Electronic document label module 114 may determine the set of possible labels based on possible labels assigned to each cluster. For example, electronic document label module 114 may generate an embedding for an electronic document and map the embedding to a cluster maintained by the vector database. Electronic document label module 114 may determine the set of possible labels based on the set of possible labels being assigned to the cluster that the embedding for the electronic document was mapped to. In this way, electronic document label module 114 may more efficiently determine possible labels by organizing attributes or characteristics of electronic documents using vector databases.

Electronic document label module 114 may determine, for each object associated with an electronic document, a preliminary label based on a set of possible labels. Electronic document label module 114 may determine a preliminary label for an object of an electronic document as a label included in the set of possible labels. For example, electronic document label module 114 may determine a first preliminary label for an agreement type object of an electronic document as "lease agreement" based on the set of possible labels including a possible label of "lease agreement." Electronic document label module 114 may determine a second preliminary label for a clause type object of an electronic document representing a clause of the electronic document as "lease term" based the set of possible labels including a possible label of "lease term."

Electronic document label module 114 may determine, for each object associated with an electronic document, an indication of content of an object based on a corresponding preliminary label. Electronic document label module 114 may determine an indication of content of an object as values of the data structures included in the object. For example, electronic document label module 114 may determine an indication of content of an object, associated with a preliminary label of "lease term," as the strings of text in an electronic document that indicate the object corresponds to the preliminary label. Electronic document label module 114 may generate the indication of content of an object by applying a large language model to generate a summary of content in an electronic document that corresponds to an object. In other words, electronic document label module 114 may determine the indication of content of an object as content of an electronic document that electronic document label module 114 analyzed when determining the preliminary label.

Electronic document label module 114 may generate data for a graphical user interface to include a preliminary label and a corresponding indication of content of an object associated with the preliminary label. Electronic document label module 114 may generate data for a graphical user interface that presents the preliminary label alongside the indication of content of an object. Electronic document label module 114 may include, in the data for the graphical user interface, an option for a user interacting with the graphical user interface to select whether the preliminary label is approved as representing an accurate label for the indication of content of the object. Electronic document label module 114 may include, in the data for the graphical user interface, an option for the user interacting with the graphical user interface to input a correct label in instances where the user selects the option associated with the preliminary label being incorrect. Document management platform 102 may output, via network 111, the data for the graphical user interface to any one of user devices 108.

Document management platform 102 may receive a request for accessing an electronic document managed by document management platform 102. Based on receiving a request for accessing an electronic document, document management platform 102 may output the data for the graphical user interface, that includes a preliminary label and a corresponding indication of content of an object, to the user device that requested access to the electronic document, in addition to data for the requested electronic document. For example, user device 108A may login to a software application client managed by document management platform 102 by submitting credentials for a user account to document management platform. Once user device 108A has access to the software application client and is signed into the user account, a user operating user device 108 may navigate to a graphical user interface for reviewing electronic documents. User device 108A may request access to an electronic document via the software application client managed by document management platform 102. User device 108 will request access to an electronic document that is not stored in document dataset 112, but rather will request access to an electronic document managed by document management platform 102 (e.g., an electronic document that a user operating user device 108A is drafting or revising). In response to receiving the request to access the electronic document, document management platform 102 may output, to user device 108A via network 111, data for the requested electronic document and the data for the graphical user interface that includes a preliminary label and a corresponding indication of content of an object (e.g., a determined object of a document stored at document dataset 112). User device 108A may output the data for the requested electronic document and the data for the graphical user interface to a display device of user device 108A. User device 108A may be configured to output the data for the graphical user interface as an unobtrusive popup (e.g., a closeable window). In some instances, user device 108A may opt-in or opt-out of contributing to approving preliminary labels. In some examples, user device 108A may configure a timer for how often and/or when document management platform 102 will send data for graphical user interfaces that request approval of preliminary labels.

Document management platform 102 may receive community data from user devices 108. Document management platform 102 may receive community data that at least includes an indication of whether a preliminary label is approved. For example, a user operating user device 108A may select an option in the graphical user interface indicating whether a preliminary label included in the graphical user interface is approved with respect to the indication of content of an object included in the graphical user interface. User device 108A may send, to document management platform 102 via network 111, the selected option as an indication of whether a preliminary label is approved. Document management system 102 may receive community data that at least includes the indication of whether a preliminary label is approved. In some instances, document management system 102 may receive community data representing responses or selections of approvals or manual labels users of user devices 108 input by interacting with graphical user interfaces generated by electronic document label module 114. In general, document management platform 102 may receive community data that includes indications of whether preliminary labels for electronic document objects have been approved or verified. In this way, document management platform 102 may maintain and apply community data to further improve an accuracy of electronic document object labeling.

Document management system 102 may store community data that includes preliminary labels with indications of whether the preliminary labels are accurate, and indications of corresponding user account identifiers associated with the indications of whether the preliminary labels are accurate. In this way, document management system 102 may maintain a log of what user accounts have contributed to the approval and/or verification of preliminary labels, which may be used to indicate a certainty of preliminary labels determined for electronic document objects. Document management platform 102 may, for example, maintain community as a log specifying which user accounts approved or verified a preliminary label. Document management platform 102 may assign a certainty value to preliminary labels based on a status of a user account (e.g., position, number of point values assigned to the user account, etc.) and/or based on whether preliminary labels have been verified. Document management platform 102 may apply weights to preliminary labels based on the certainty values assigned to preliminary labels. Document management platform 102 may store preliminary labels with weights satisfying a threshold, as well as corresponding indications of objects, at training database 118.

Electronic document label module 114 may assign point values to user accounts associated with user devices 108 based on community data. For example, electronic document label module 114 may determine a user account associated with user device 108A that sent the indication of whether a preliminary label is approved. Electronic document label module 114 may determine the user account associated with a user device based on login credentials applied to a software application client the user device used to send indications of whether a preliminary label is approved. For instance, electronic document label module 114 may determine that the user account is for a particular user (e.g., human or business entity) in response to determining that the user credentials used to login to a software application supported by document management platform 102 match credentials for that particular user. Electronic document label module 114 may adjust point values (e.g., add points) associated with the user account that sent an indication of whether a preliminary label is approved based on receiving the community data from the user account. For instance, electronic document label module 114 may increase a count value for the user account by a predetermined amount in response to receiving the community data from the user account and/or in response to receiving community data from another user account that validates the preliminary label. In this way, electronic document label module 114 may incentive users to contribute to the labeling of electronic documents compared to systems that do not use a count value for user accounts, which may help to further improve an accuracy of the labels generated by document management platform 102.

Electronic document label module 114 may generate approval state information based on received community data. Electronic document label module 114 may identify, in the community data, the indication that a preliminary label has been approved. Electronic document label module 114 may generate approval state information that includes values corresponding to indications that a preliminary label has been approved, denied, includes a manual label, or the like. Electronic document label module 114 may generate approval state information for a preliminary label for an object (e.g., agreement type object, clause type objects, etc.) that corresponds to responses received from user devices 108 when interacting with a graphical user interface that requests approval of the preliminary label. For example, electronic document label module 114 may receive community data that includes an indication that a first preliminary label for a first object is approved. Electronic document label module 114 may generate, based on the community data, approval state information for the first preliminary label that includes a value of "1" corresponding to an approval state of the first preliminary label being approved. Electronic document label module 114 may receive community data that includes an indication that a second preliminary label for a second object is not approved. Electronic document label module 114 may generate, based on the community data, approval state information for the second preliminary label that includes a value of "0" corresponding to an approval state of the second preliminary label being denied. Electronic document label module 114 may generate approval state information to include user account identifiers associated with the user devices that submitted responses to requests to verify and/or approve preliminary labels. In this way, electronic document label module 114 may generate approval state information for preliminary labels that indicates a confidence or trustworthiness of approval or verification of preliminary labels.

Electronic document label module 114 may output a preliminary label and content of a corresponding object based on the approval state information. For instance, electronic document label module 114 may output the preliminary label and object content information based on whether approval state information associated with the preliminary label indicates that the preliminary label has been approved and/or verified by users of user devices 108. In some instances, electronic document label module 114 may output an indication of the preliminary label, an indication of the object content information, and an indication of a user account identifier associated with the community data used to generate the approval state information for the preliminary label to training database 118 as a training data item. Electronic document label module 114 may output the preliminary label and object content information as labeled training data that training platform 120 may use to train machine learning models 122 to perform document management functionality. In some examples, electronic document label module 114 may output the preliminary label and object content information to training database 118 that be accessed by document management platform 102 and/or third party computing systems for document management tasks.

Electronic document label module 114 may generate training data for training database 118 based on approval state information associated with preliminary labels. For instance, electronic document label module 114 may generate, based on the approval state information, training data that includes at least an indication of the preliminary label and an indication of an object associated with the preliminary label. For example, electronic document label module 114 may generate training data that includes an indication of an object representing a clause of an electronic document and an indication of an approved, preliminary label of "governing law" for the object. In some examples, electronic document label module 114 may include approval state information in the generated training data to indicate a level of confidence associated with the preliminary labels. Electronic document label module 114 may store the training data in training database 118. Document management platform 102 may send training data stored at training database 118 to training platform 120 to initiate training of machine learning models 122 using training data of training database 118. Training platform 120 may train one or more of machine learning models 122 based on labeled training data included in training database 118. For example, training platform 120 may use labeled training data of training database 118 to train machine learning model 122A for NLP or LSA/LSI applications associated with electronic document management. In this way, document management platform 102 may generate a large number of labels for electronic document objects that may be consistent and accurate such that training of machine learning models 122 is improved.

The techniques described herein may provide one or more technical advantages that realize one or more practical applications. For example, document management platform 102 may reduce manual input required for labeling electronic documents for training machine learning models to perform document management functionality. By automatically determining a preliminary label, document management platform 102 may significantly reduce time and improve consistency when labeling large amounts of electronic documents for training data. Document management platform 102 may manage an approval and/or verification process to determine whether preliminary labels are accurate or need to be changed. Document management platform 112 may generate approval state information for preliminary labels to track preliminary labels and determine a certainty of the preliminary labels such that labeling of electronic document objects is efficient and accurate. Document management platform 112 may output accurate preliminary labels based on the approval state information by, for instance, determining the approval state information for the preliminary labels indicates a threshold certainty value. Additionally, or alternatively, document management platform 102 may incentive users to contribute to the approval and verification process with points and/or prizes (e.g., badges, digital incentives, etc.) to gamify and crowdsource the approval and verification process. In this way, document management platform 102 may accurately label mass amounts of electronic documents compared to systems that do not use point values for user accounts. By accurately labeling mass amounts of electronic documents, document management platform 102 may improve training machine learning models 122 to perform document management functionality.

Figure 2:
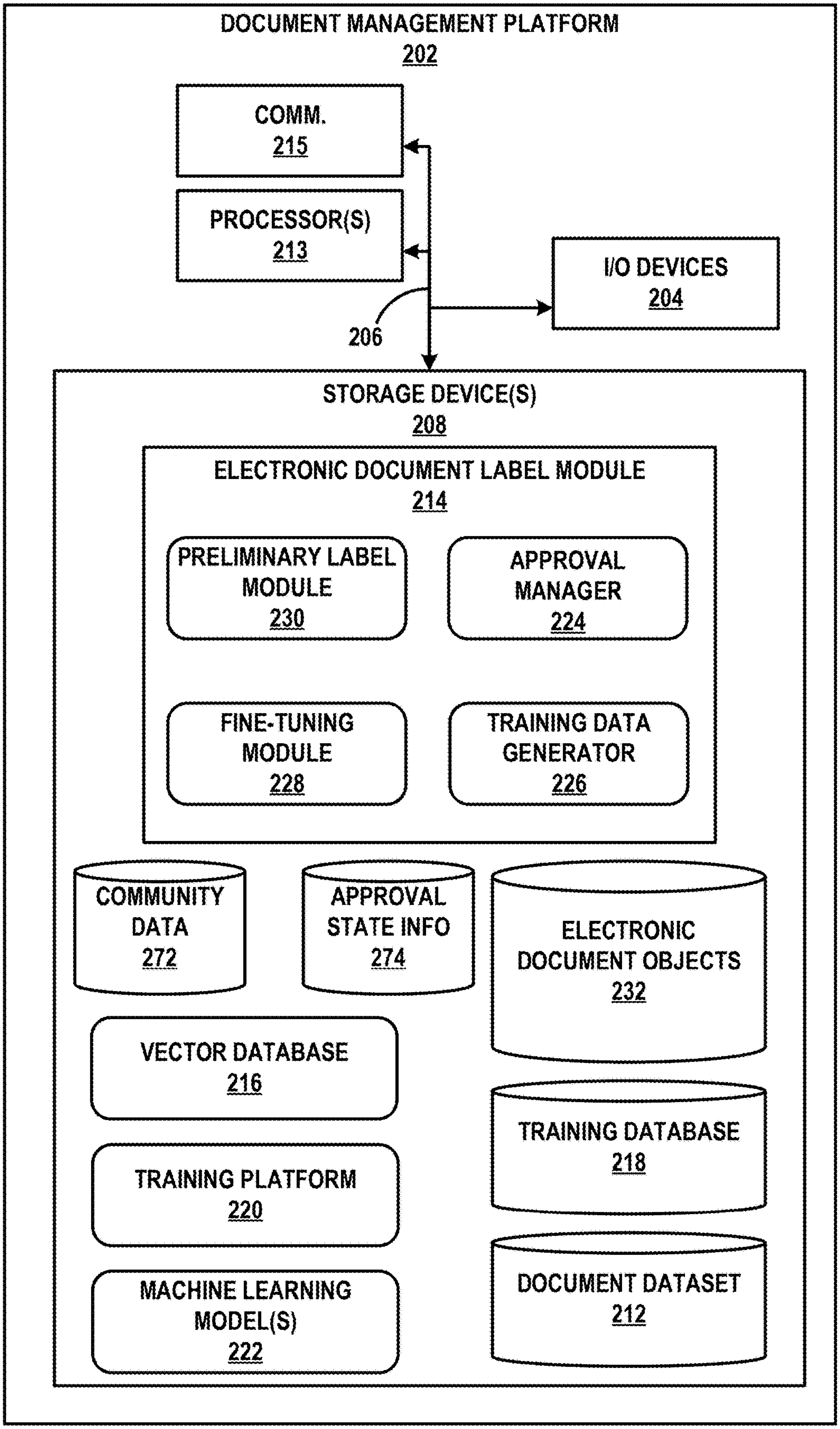
FIG. 2 is a block diagram illustrating an example document management platform for managing the labeling of electronic documents at scale, in accordance with techniques of this disclosure.

FIG. 2 is a block diagram illustrating example document management platform 202 for managing the labeling of electronic documents at scale, in accordance with techniques of this disclosure. Document management platform 202, electronic document label module 214, training database 218, document dataset 212, training platform 220, and one or more machine learning models 222 of FIG. 2 may be example or alternative implementations of document management platform 102, electronic document label module 114, training database 118, document dataset 112, training platform 120, and machine learning models 122 of FIG. 1, respectively. FIG. 2 illustrates only one particular example of document management platform 202, and many other examples of document management platforms may be used in other instances and may include a subset of components included in example document management platform 202 or may include additional components not shown in FIG. 2. For example, functionality of processors 213, communication units 215, I/O devices 204, and/or storage devices 208 may be distributed across multiple computing devices within a cloud-based environment provided by document management platform 202.

In the example of FIG. 2, document management platform 202 includes communication units 215, one or more processors 213, input/output (I/O) devices 204, one or more storage devices 208, and communication channels 206. Communication channels 206 may interconnect each of the components 215, 213, 204, and 208 for inter-component communications (physically, communicatively, and/or operatively). In some examples, communication channel 206 may include a system bus, a network connection, an inter-process communication data structure, or any other method for communicating data.

Communication units 215 of document management platform 202 may communicate with one or more external devices via one or more wired and/or wireless networks by transmitting and/or receiving network signals on the one or more networks. Examples of communication units 215 include a network interface card (e.g., such as an Ethernet card), an optical transceiver, a radio frequency transceiver, a GNSS receiver, or any other type of device that can send and/or receive information. Other examples of communication units 215 may include short wave radios, cellular data radios (for terrestrial and/or satellite cellular networks), wireless network radios, as well as universal serial bus (USB) controllers.

One or more input devices of I/O devices 204 may represent any input devices of document management platform 202 not otherwise separately described herein. Input devices of I/O devices 204 may generate, receive, and/or process input. For example, one or more input devices of I/O devices 204 may generate or receive input from a network, a user input device, or any other type of device for detecting input from a human or machine.

One or more output devices of I/O devices 204 may represent any output devices of document management platform 202 not otherwise separately described herein. Output devices of I/O devices 204 may generate, present, and/or process output. For example, one or more output devices of I/O devices 204 may generate, present, and/or process output in any form. Output devices of I/O devices 204 may include one or more universal serial bus (USB) interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

Processors 213 may include processing circuitry for implementing functionality and/or execute instructions within document management platform 202. For example, processors 213 may receive and execute instructions that provide the functionality of electronic document label module 214, community data 272, approval state information 274, training platform 220, machine learning models 222, vector database 216, electronic document objects 232, document dataset 212, and/or training database 218. These instructions executed by processors 213 may cause document management platform 202 to store and/or modify information within storage devices 208 or processors 213 during program execution. Processors 213 may execute instructions of electronic document label module 214, community data 272, approval state information 274, training platform 220, machine learning models 222, vector database 216, electronic document objects 232, document dataset 212, and/or training database 218 to perform one or more operations. That is electronic document label module 214, community data 272, approval state information 274, training platform 220, machine learning models 222, vector database 216, electronic document objects 232, document dataset 212, and/or training database 218 may be operable by processors 213 to perform various functions described herein. In some instances, processors 213 may include processing circuitry associated with cloud computing processing components (e.g., distributed processors across a cloud computing platform).

In the example of FIG. 2, storage devices 208 may include electronic document label module 214, community data 272, approval state information 274, training platform 220, machine learning models 222, vector database 216, electronic document objects 232, document dataset 212, and training database 218. Storage devices 208 within document management platform 202 may store information for processing during operation of document management platform 202 (e.g., document management platform 202 may store data accessed by electronic document label module 214, community data 272, approval state information 274, training platform 220, machine learning models 222, vector database 216, electronic document objects 232, document dataset 212, and/or training database 218 during execution at document management platform 202). In some examples, storage devices 208 may be a temporary memory, meaning that a primary purpose of storage devices 208 is not long-term storage. Storage devices 208 on document management platform 202 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 208 may include one or more computer-readable storage media. Storage devices 208 may be configured to store larger amounts of information than volatile memory. Storage devices 208 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 208 may store program instructions and/or information associated with electronic document label module 214, community data 272, approval state information 274, training platform 220, machine learning models 222, vector database 216, electronic document objects 232, document dataset 212, and/or training database 218. In some instances, storage devices 108 may include cloud storage components (e.g., distributed storage devices across a cloud computing environment).

Storage devices 208 may store electronic document label module 214, community data 272, approval state information 274, training platform 220, machine learning models 222, vector database 216, electronic document objects 232, document dataset 212, and/or training database 218. Electronic document label module 214, in the example of FIG. 2, includes preliminary label module 230, approval manager 224, training data generator 226, and fine-tuning module 228.

Preliminary label module 230 may include computer-readable instructions for processing electronic documents stored at document dataset 212 to determine objects of the electronic documents stored at electronic document objects 232. Preliminary label module 230 may determine objects of an electronic document by applying natural language processing (NLP) techniques and/or latent semantic indexing/analysis (LSI/LSA) techniques. For example, preliminary label module 230 may apply a machine learning model (e.g., a pre-trained generative machine learning model) to parse and understand a context of an electronic document stored at document dataset 212. Preliminary label module 230 may apply the machine learning model to generate embeddings or vectors for the electronic document that capture the context of the electronic document based on a context window the machine learning model has been configured to apply. A context of an electronic document may include semantic information included in electronic documents, such as an agreement title, party names, clause title and text, price terms, or the like.

Preliminary label module 230 may partition an electronic document into objects based on the context. For example, preliminary label module 230 may partition the document into a plurality of objects that include an agreement type object associated with a determined agreement type based on the semantic information of an electronic document. Preliminary label module 230 may additionally or alternatively apply the machine learning model to partition, based on semantic information included in an embedding associated with an agreement document, strings of text in the agreement into a clause library, where each entry in the clause library corresponds to an object representing an agreement clause. Preliminary label module 230 may store determined objects of electronic documents at electronic document objects 232. Electronic document objects 232 may include one or more storage components configured to store data indicating determined objects of electronic documents.

Preliminary label module 230 may store embeddings in vector database 216 to improve subsequent determination of objects of electronic documents. Embeddings may include high dimensional vectors or arrays that capture semantic information of portions of sample electronic documents. Vector database 216 may include a specialized database configured to store, index, and/or query high-dimensional vector representations of data, such as embeddings generated using the large language model of preliminary label module 230. Preliminary label module 230 may apply vector database 216 to generate clusters of objects that correspond to possible labels for objects within the clusters. For example, preliminary label module 230 may store embeddings, generated by a large language model, for objects of example electronic documents in vector database 216. Preliminary label module 230 may map the embeddings to an embedding space or vector space stored at vector database 216, where the embedding space or vector space includes a high dimensional space with dimensions corresponding to the embeddings generated by the large language model. Preliminary label module 230 may generate clusters based on the mapping of the embeddings stored in vector database 216. For example, preliminary label module 230 may apply similarity search techniques (e.g., K-Nearest Neighbors, Approximate Nearest Neighbors, etc.) to generate clusters of similar embeddings.

Preliminary label module 230 may assign each cluster a label corresponding to an attribute or characteristics represented in objects associated with embeddings included in the cluster. In some instances, preliminary label module 230 may assign a cluster a label that is included in a set of possible labels that may defined based on document management functionality a machine learning model of machine learning models 222 may be trained to perform. In some examples, preliminary label module 230 may assign a cluster a label defined based on characteristics (e.g., lease term, monthly rate, landlord name, tenant name, property details, etc.) associated with an agreement type (e.g., lease agreement type) represented in an agreement type object of electronic documents. Preliminary label module 230 may include a large language model that is trained to identify the characteristics and generate a set of possible labels based on the characteristics. Preliminary label module 230 may store a mapping of possible labels in the set of possible labels to corresponding object clusters that include objects that may, in some examples, be associated with a particular agreement type or agreement type object. Preliminary label module 230 may determine a set of possible labels for an electronic document based on agreement types or agreement type objects determined for the electronic document. In this way, preliminary label module 230 may efficiently determine a set of possible labels with little to no user input.

Preliminary label module 230 may determine a preliminary label for an object of an electronic document based on a set of possible labels. For example, preliminary label module 230 may apply a large language model to determine an object of an electronic document stored at document dataset 212, as described above. Preliminary label module 230 may apply the large language model to determine a context of the electronic document that includes semantic information associated with the object. Preliminary label module 230 may map, based on the context of the electronic document, the object to a cluster generated using vector database 216. Preliminary label module 230 may determine a preliminary label for the object based on the mapping of the object to the cluster. For example, preliminary label module 230 may determine a preliminary label for an object mapped to a cluster based on a label assigned to the cluster the object was mapped to.

Preliminary label module 230 may send preliminary labels and indications of content of corresponding objects to approval manager 224. For example, preliminary label module 230 may send, to approval manager 224, a preliminary label of "agreement type: statement of work" and an indication of content of a corresponding object that includes strings of text of an electronic document that preliminary label module 230 analyzed as including semantic information corresponding to the preliminary label. Approval manager 224 may generate data for a graphical user interface that includes a preliminary label and the indication of content of a corresponding object. In some instances, approval manager 224 may generate data for the graphical user interface that includes a string of text that presents the preliminary label as a question of whether the preliminary label accurately corresponds to the indication of content of a corresponding object.

Approval manager 224 may include a document management client manager that includes software readable instructions for managing user accounts for users that may interact with functionality of document management platform 202. For example, approval manager 224 may securely manage and store user account information such as registered user identifiers, corresponding user account passwords, status identifiers associated with the user account (e.g., position or role of a user associated with the user account), or the like. In some instances, approval manager 224 may store a timer for each user account managed by approval manager 224. Approval manager 224 may maintain a timer for a user account that defines a periodicity or frequency approval manager 224 may request a user associated with the user account to approve a preliminary label determined for an object of an electronic document stored at document dataset 212. Approval manager 224 may adjust a timer for a user account based on receiving an indication, from a user device (e.g., user device 108A of FIG. 1) signed into the user account, to change the frequency of how often a user associated with the user account will receive a request to approve a preliminary label.

Approval manager 224 may receive a request to access an electronic document stored and managed using document management platform 202. For example, approval manager 224 may receive, from a user device (e.g., user device 108A of FIG. 1) signed into a user account, a request to access an electronic document that a user operating the user device is reviewing or editing. Based on receiving the request for accessing the electronic document, approval manager 224 may output, to the user device requesting access to the electronic document, data for the requested electronic document, as well as data for a graphical user interface that includes a preliminary label and an indication of content of a corresponding object.

In some examples, approval manager 224 may cause a user device to output graphical user interfaces based on a timer that defines a predetermined amount of time between responses to requests to approve or verify preliminary labels. For example, approval manager 224 may output a first graphical user interface to a user device that requests approval of a first preliminary label. Based on a timer associated with the user device elapsing, approval manager 224 may output a second graphical user interface to the user device that requests approval of a second preliminary label. In some instances, based on the timer elapsing, approval manager 224 may cause the user device to no longer store (e.g., delete) data for the first graphical user interface requesting approval of the first preliminary label. Approval manager 224 may output, to a user device and in response to receiving an indication from the user device approving or rejecting a preliminary label, data for a graphical user interface including a prompt requesting whether a user wants to further contribute to approving or rejecting preliminary labels. In this way, approval manager 224 may control how long users have to approve or reject preliminary labels.

In some instances, approval manager 224 may output data for graphical user interfaces requesting approval or verification of preliminary labels based on a timer associated with a user account that a user device may be logged in to. For instance, approval manager 224 may cause a user device to output data for a first graphical user interface requesting approval of a first preliminary label within a first time frame defined in a timer. Approval manager 224 may additionally, or alternatively, cause the user device to output data for a second graphical user interface requesting approval of a second preliminary label within a second time frame defined in the timer. In this way, users may configure how often they are prompted to contribute to approving or verifying preliminary labels. Approval manager 224 may output the data for graphical user interfaces to user devices using communication units 215.

Approval manager 224 may obtain community data including one or more indications of whether a preliminary label is approved. Approval manager 224 may store community data at community data 272. Community data 272 may include one or more storage components for storing community data that includes responses to requests to approve or verify preliminary labels and corresponding user account identifiers Approval manager 224 may receive, via communication units 215, community data 272 as indications of whether preliminary labels are approved based on user interaction with graphical user interfaces that include the preliminary labels and indications of content of corresponding objects. For example, approval manager 224 may receive community data 272 as data indicating a user selection of an approve button or not approved button included in the graphical user interface output by approval manager 224.

Approval manager 224 may generate approval state information 274 based on the received community data 272. For example, approval manager 224 may generate approval state information 274 as values indicating whether preliminary labels have been approved or verified. Approval manager 224 may store approval state information 274 as metadata of preliminary labels. Approval manager 224 may store approval state information 274 for a preliminary label that includes an indication of one or more user account identifiers associated with the user inputs (e.g., community data 272) used to generate the approval state information 274 for the preliminary label. Approval manager 224 may update approval state information 274 of preliminary labels based on a verification process. For example, approval manager 224 may update approval state information of a preliminary label to include an indication of whether the preliminary label has been verified and an indication of a user account associated with the indication of whether the preliminary label has been verified.

Approval manager 224 may generate data for another graphical user interface to verify whether the indication of whether a preliminary label is approved is accurate. Approval manager 224 may generate data for a second graphical user interface that includes a preliminary label, an indication of content of a corresponding object, and an indication of whether the preliminary label is approved. Approval manager 224 may output data for the second graphical user interface to a user device (e.g., user device 108N of FIG. 1) that is different than the user device that sent the indication of whether the preliminary label is approved. In some instances, approval manager 224 may output data for the second graphical user interface to a user device signed into a user account associated with a particular account status. For example, approval manager 224 may determine an account status of a user account associated with a user device.

Approval manager 224 may select the user device based on the account status of the user account associated with the user device indicating the user account has a verifier status. Approval manager 224 may output data for the second graphical user interface to the user devices associated with the verifier status. For example, approval manager 224 may output data for the second graphical user interface to a user device signed into a user account associated with an account status of "reviewer," "legal team," "data scientist," or any other indication that the user account is associated with a user that is authorized or trusted to verify whether preliminary labels are accurate. In some instances, approval manager 224 may assign a user account an account status for verifying approvals or disapprovals of preliminary labels based on a number of points associated with the user account. In some instances, approval manager 224 may assign a user account an account status indicating a user account has a verifier status based on a position (e.g., role at a company, experience, etc.) of a user associated with the user account.

Approval manager 224 may receive community data 272 that includes responses to graphical user interfaces for verifying preliminary labels. Approval manager 224 may generate and/or update approval state information 274 for preliminary labels based on responses to the graphical user interfaces for verifying preliminary labels. For example, approval manager 224 may generate a verification graphical user interface that includes a preliminary label, content of a corresponding object, and an indication that the preliminary label has been disapproved. Approval manager 224 may generate approval state information 274 indicating the preliminary label is disapproved (e.g., approval state information with a value of “0”). Approval manager 224 may receive an indication in response to the verification graphical user interface indicating the preliminary label has been approved. Approval manager 224 may update approval state information 274 to indicate the preliminary label is approved (e.g., update the approval state information with a value of “1”). Approval manager 224 may additionally, or alternatively, update approval state information 274 to include an indication of a user account that submitted the indication of whether the preliminary label is approved.

Approval manager 224 may assign point values to user accounts based on community data 272. For example, approval manager 224 may adjust point values associated with user accounts based on a number of indications of whether preliminary labels are approved that are received from the user accounts. Approval manager 224 may assign point values to a user account that has responded to a request to approve a preliminary label by selecting an option of whether the preliminary label is approved in the graphical user interface sent and generated by approval manager 224. In some instances, approval manager 224 may assign point values to user accounts in response to receiving verification that the indication of whether the preliminary label is approved. In some examples, approval manager 224 may maintain a leader board of user accounts and/or update a status of a user account based on point values assigned to user accounts.

In some examples, fine-tuning module 228 may fine-tune a machine learning model of preliminary label module 230 to better determine objects and/or determine preliminary labels for objects. For instance, fine-tuning module 228 may fine-tune a machine learning model of preliminary label module 230, such as a trained generative model that may be fine-tuned to determine preliminary labels for a large corpus of electronic documents, a natural language processing model that may be fine-tuned to find certain electronic document objects (e.g., clause document objects) at scale, or the like. In some examples, preliminary label module 230 may include a relatively untrained generative model for determining preliminary labels for determined objects of electronic documents includes in document dataset 212. Fine-tuning module 228 may obtain indications of whether preliminary labels are approved. Fine-tuning module 228 may fine-tune (e.g., adjust weights, biases, etc.) the machine learning model of preliminary label module 230 based on whether the machine learning model accurately determined an object and corresponding preliminary label for the object. In some examples, fine-tuning module 228 may fine-tune a first machine learning model of preliminary label module 230 to determine objects and corresponding preliminary labels for a first category of objects, such as agreement type objects, agreement clause objects, contract value objects, or the like. Fine-tuning module 228 may fine tune a second machine learning model of preliminary label module 230 to determine objects and corresponding preliminary for a second category of objects, and so on.

Training data generator 226 may generate training data based on approval state information. For instance, approval manager 224 may output, based on approval state information 274 indicating a preliminary label has been approved or verified, the preliminary label and content of a corresponding object to training data generator 226 to generate training data. Approval manager 224 may output, to training data generator 226, a preliminary label-object pair that includes an indication of the preliminary label and content of a corresponding object. Training data generator 226 may generate training data to include at least an indication of the preliminary label and an indication of an object corresponding to the preliminary label. For example, training data generator 226 may generate training data that includes content of an objects (e.g., a chunk of text of an electronic document) and a preliminary label determined for the object that has been approved and/or verified. In some examples, training data generator 226 may generate a training data item to include an indication of a preliminary label, an indication of content of a corresponding object, and an indication of a user account associated with community data 272 used to generate approval state information 274 associated with the preliminary label. For example, training data generator 226 may generate the indication of content of an object by providing text associated with the object to a machine learning model to output a summary of the provided text as the indication of content of the object. Training data generator 226 may store generated training data in training database 218. Document management platform 202 may instruct training platform 220 to initiate training of machine learning models 222 using training data of training database 218

Training platform 220 may apply labeled training data stored in training database 218 to initiate training of one or more machine learning models 222 to perform functionality associated with electronic document management applications. For example, training platform 220 may initiate, based on pairs of approved or verified labels and corresponding electronic document objects stored at training database 218, training of a first machine learning model of machine learning models 222 to perform document management functionality of classifying document types of electronic documents. Training platform 220 may initiate, based on pairs of approved or verified labels and corresponding electronic document objects stored at training database 218, training of a second machine learning model of machine learning models 222 to perform document management functionality of distinguishing contracts or agreements from supplemental documents. Training platform 220 may initiate, based on pairs of approved or verified labels and corresponding electronic document objects stored at training database 218, training of a third machine learning model of machine learning models 222 to perform document management functionality of recognizing fields of an electronic document, such as signature blocks. In general, training platform 220 may apply the labeled training data of training database 218 to initiate training of machine learning models 222 to perform tasks associated with electronic document management.

Figure 3:
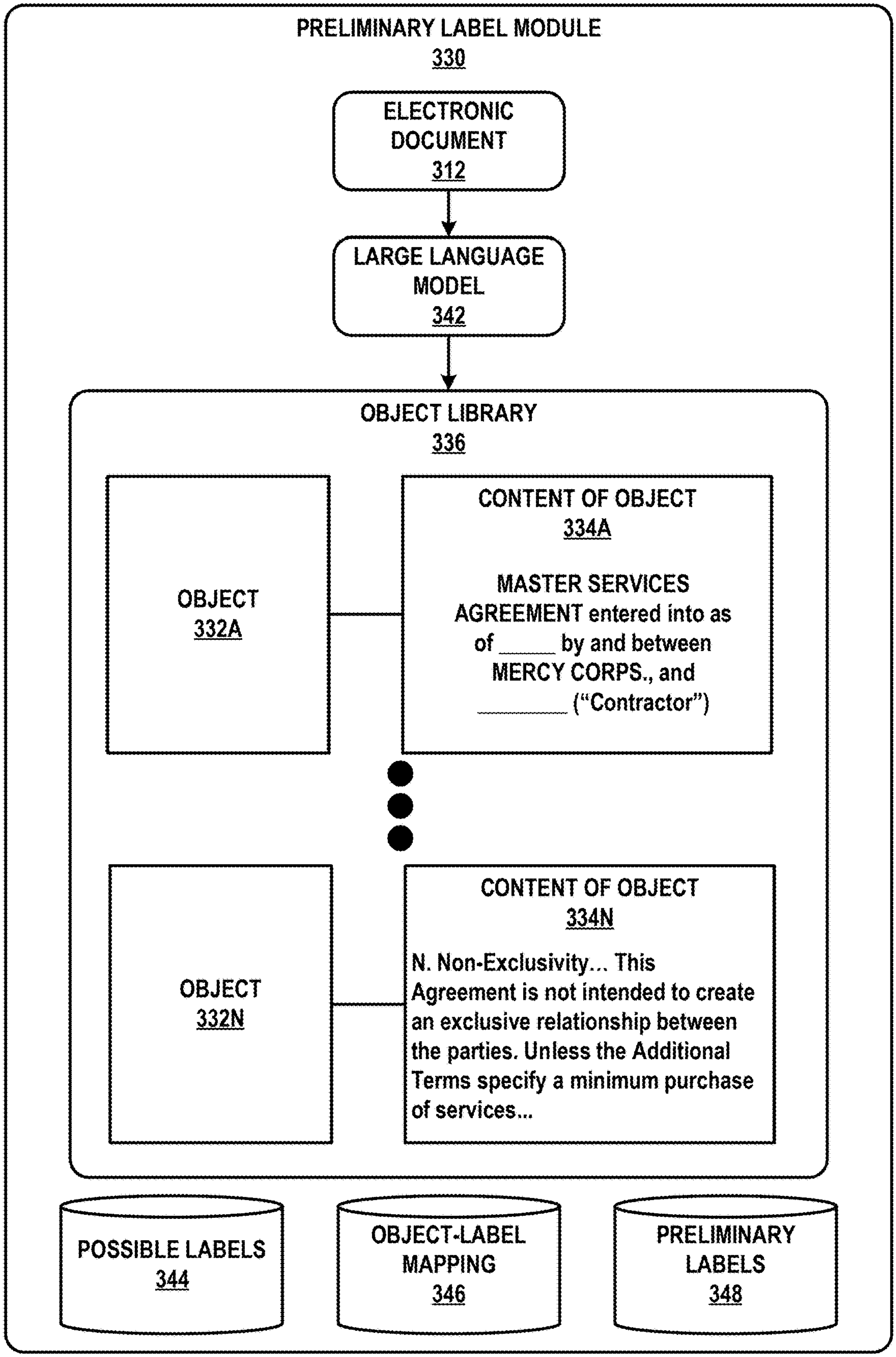
FIG. 3 is a conceptual diagram illustrating example objects for an example electronic document, in accordance with one or more techniques of this disclosure.

FIG. 3 is a conceptual diagram illustrating example objects 332 for example electronic document 312, in accordance with one or more techniques of this disclosure. Preliminary label module 330 may be an example or alternative implementation of preliminary label module 230 of FIG. 2. In the example of FIG. 3, preliminary label module 330 may include electronic document 312, large language model 342, object library 336, possible labels 344, object-label mapping 346, and preliminary labels 348.

Preliminary label module 330 may obtain electronic document 312 from a document dataset including electronic documents to be labeled for training a machine learning model. Preliminary label module 330 may input electronic document 312 in large language model 342. Large language model 342 may include a machine learning model, such as a pre-trained generative model (e.g., a large language model) that may determine and output objects 332A-332N (collectively referred to herein as, "objects 332") based on semantic analysis of electronic document 312. Large language model 342 may output objects 332 as object library 336. Object library 336 may include a clause library and/or a relational database of document objects to content of objects.

In operation, large language model 342 may process electronic document 312 to generate tokens for electronic document 312. Large language model 342 may generate a token for electronic document 312 that represents a word, a sentence, a paragraph, or multiple paragraphs included in electronic document 312. Large language model 342 may convert the generated tokens into embeddings or numerical representations capturing a context of electronic document 312. Large language model 342 may generate embeddings as vector representations of semantic information associated with attributes or characteristics of electronic document 312. Large language model 342 may partition electronic document 312 into objects 332 based on the semantic information associated with attributes or characteristics of electronic document 312.

Large language model 342 may generate and output object library 336 as a relational database with an entry including an object of object 332A and corresponding content of object of content of objects 334. Content of objects 334 may include the partitioned portion of electronic document 312 that large language model 342 determined to be an attribute or characteristic of electronic document 312. In the example of FIG. 3, large language model 342 may generate object library 336 to include a first entry with an agreement type attribute object 332A and corresponding content of object 334A that includes text of "MASTER SERVICES AGREEMENT." Large language model 342 may generate object library 336 to include a second entry with a clause characteristic object 332N and corresponding content of object 334N that includes text of "Non-exclusivity."

Preliminary label module 330 may store possible labels 344. Possible labels 344 may include multiple sets of possible labels that may be specific to particular training tasks for machine learning models (e.g., tasks associated with document management functionality) and/or specific to different categories of electronic documents. For example, possible labels 344 may include a first set of possible labels for electronic documents associated with a non-disclosure agreement type, a second set of possible labels for electronic documents associated with lease agreement types, and so on. In some instances, possible labels 344 may include a vector set that indicates a likelihood of a type of document including a label.

In some examples, preliminary label module 330 may generate the set of possible labels. Preliminary label module 330 may generate the set of possible labels based on processing (e.g., determining a context of a document based on a context window) electronic document 312 using large language model 342 that has been trained to identify characteristics associated with an agreement type specified in agreement type object 332A. In this way, preliminary label module 330 may generate a set of possible labels to reduce a number of labels that are compared to each electronic document object, compared to systems that compare each electronic document object to each possible label; thereby, reducing a computational burden of determining preliminary label.

In some examples, preliminary label module 330 may determine possible labels that include a predefined set of possible labels that are determined based on document management functionality a machine learning model is being trained to perform. Preliminary label module 330 may determine a set of possible labels from possible labels 344 based on a category of preliminary labels that preliminary label module 330 may determine for each object of objects 332. For example, preliminary label module 330 may determine a set of possible labels from possible labels 344 based on agreement type object 332A specifying that content of object 334A defines an agreement type of "MASTER SERVICES AGREEMENT." Preliminary label module 330 may determine a set of possible labels in possible labels 344 that correspond to (e.g., mapped to in a relational database) possible labels that have been defined for Master Service Agreements. In this way, preliminary label module 330 may further reduce a computational burden by referencing predefined sets of possible labels to determine as a possible label.

Preliminary label module 330 may determine a preliminary label from the determined set of possible labels based on mappings of objects to labels included in object-label mapping 346. Object-label mapping 346 may include a relational database, a vector database, or other storage component that stores relationships between document objects and possible labels of possible labels 344. For example, object-label mapping 346 may include clusters of related document objects that each have been assigned one or more possible labels of possible labels 344. Preliminary label module 330 may map each of objects 332 to clusters of object-label mapping 346 to determine preliminary labels for objects 332. Preliminary label module 330 may determine a preliminary label for object 332A as a possible label mapped to the cluster associated with object 332A. In the example of FIG. 3, preliminary label module 330 may determine a preliminary label of "master service agreement" for object 332A. Preliminary label module 330 may store determined preliminary labels as preliminary labels 348.

Figure 4:
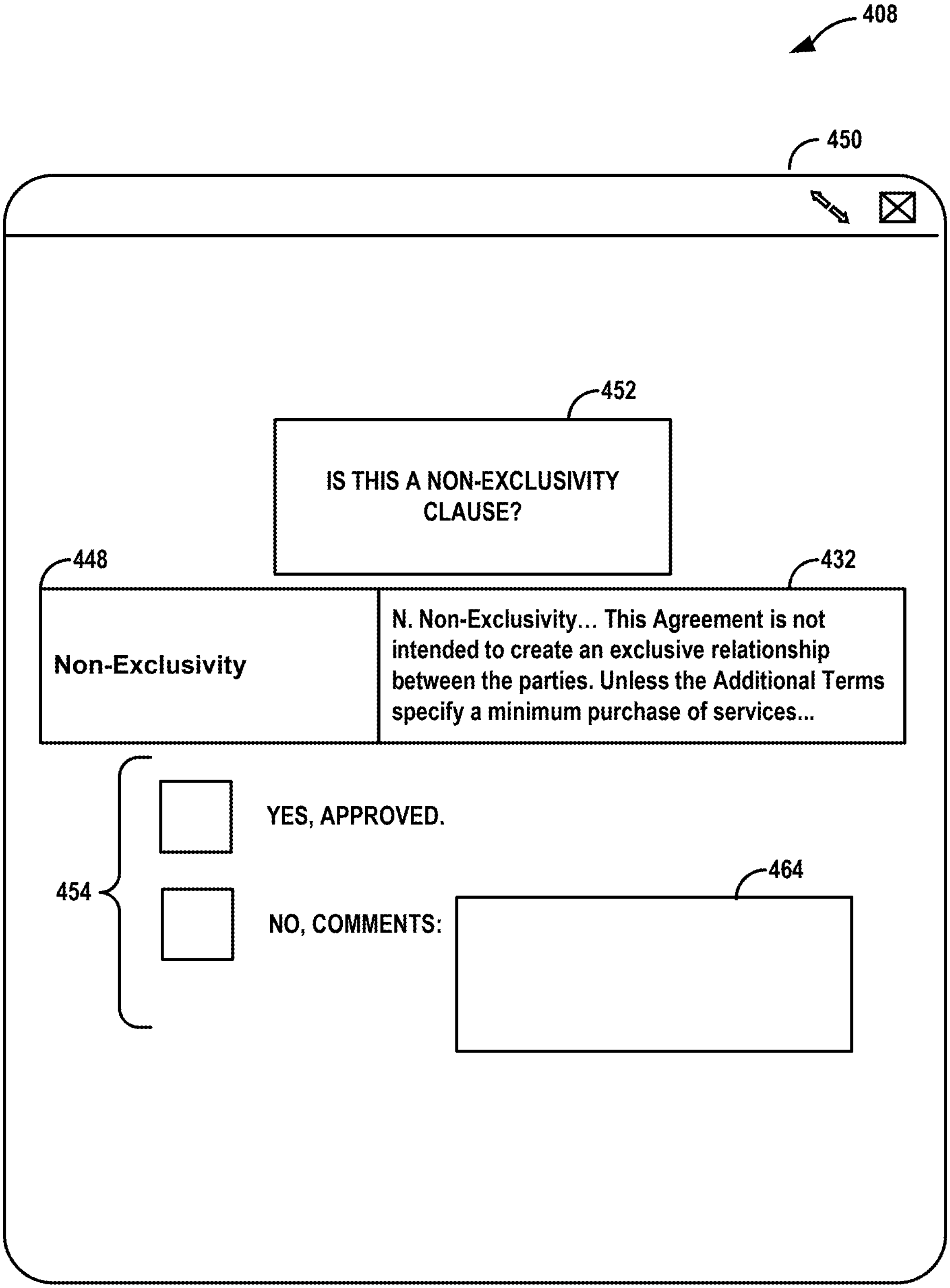
FIG. 4 is a conceptual diagram illustrating an example graphical user interface for requesting an indication of whether an example preliminary label for an example object of an electronic document is approved, in accordance with techniques of this disclosure.

FIG. 4 is a conceptual diagram illustrating example graphical user interface 450 for requesting an indication of whether example preliminary label 448 for example object 432 of an electronic document is approved, in accordance with techniques of this disclosure. User device 408 of FIG. 4 may be an example or alternative implementation of any one of user devices 108 of FIG. 1. FIG. 4 may be discussed with respect to FIG. 1 for example purposes only.

Electronic document label module 114 of document management platform may generate data for graphical user interface 450. Electronic document label module 114 may generate graphical user interface 450 based on an automatically generated preliminary labels and content of a corresponding objects (e.g., text of an electronic document object, a summary generated for the electronic document object, etc.). For instance, in the example of FIG. 4, electronic document label module 114 may generate data for graphical user interface 450 to include an indication of preliminary label 448 and an indication of content of a corresponding object 432. Electronic document label module 114 may send data for graphical user interface 450 to user device 408, via network 111 for example.

Electronic document label module 114 may cause user device 408 to output, via a display device of user device 408, graphical user interface 450 using the generated data for graphical user interface 450. Electronic document label module 114 may cause user device 408 to output graphical user interface 450 based on a timer specifying a frequency graphical user interfaces requesting approval or verification of preliminary labels is output via user device 408. For example, electronic document label module 114 may cause user device 408 to output, according to a timer defining a time window between outputs of graphical user interfaces, graphical user interface 450 as a pop-up window asking a user to approve or verify whether preliminary label 448 is accurate with respect to content of object 432. In the example of FIG. 4, graphical user interface 450 includes approval question 452, preliminary label 448, object 432, approval state selections 454, and manual label 464.

Approval questions 452 may include a string of text of a question that asks whether preliminary label 448 is an accurate label with respect to object 432. Object 432, in the example of FIG. 4, may include content of an object (e.g., any of content of objects 334 of FIG. 3) determined by the document management system that generated data for graphical user interface 450. Preliminary label 448 may include a string of text representing a preliminary label the document management system determined for object 432, as previously discussed.

Approval state selections 454 may include a field for a user to input a selection of whether preliminary label 448 is approved. In the example of FIG. 4, approval state selections 454 may include two radio boxes (a first radio box for "Yes, Approved" and a second radio box for "No"). Graphical user interface 450 may include manual label 464 as a text box that a user interacting with graphical user interface may input comments for a label that should be assigned to object 432. For example, graphical user interface 450 may include manual label 464 that prompts user input of a manual label that may be received by a user interacting with a user input device of user device 408. A user input device of user device 408 may include a device for receiving text input (e.g., a keyboard), audio input (e.g., a microphone), image input (e.g., a camera), or the like. User device 408 may send user inputs of approval state selections 454 and/or manual label 464 to a document management system to generate training data based on the user inputs of approval state selections 454 and/or manual label 464. The document management system may receive user inputs of approval state selections 454 and/or manual label 464 as community data that may be used to generate approval state information for the preliminary label. The document management system may apply the approval state information for the preliminary label to determine whether to output and include the preliminary label as a label for object 432 in training data. In some examples, the document management system may adjust points based on manual label 464. For instance, the document management system may assign a greater point value for user inputs that include data for manual label 464 compared to a point value for user inputs that do not include data for manual label 464.

Figure 5:
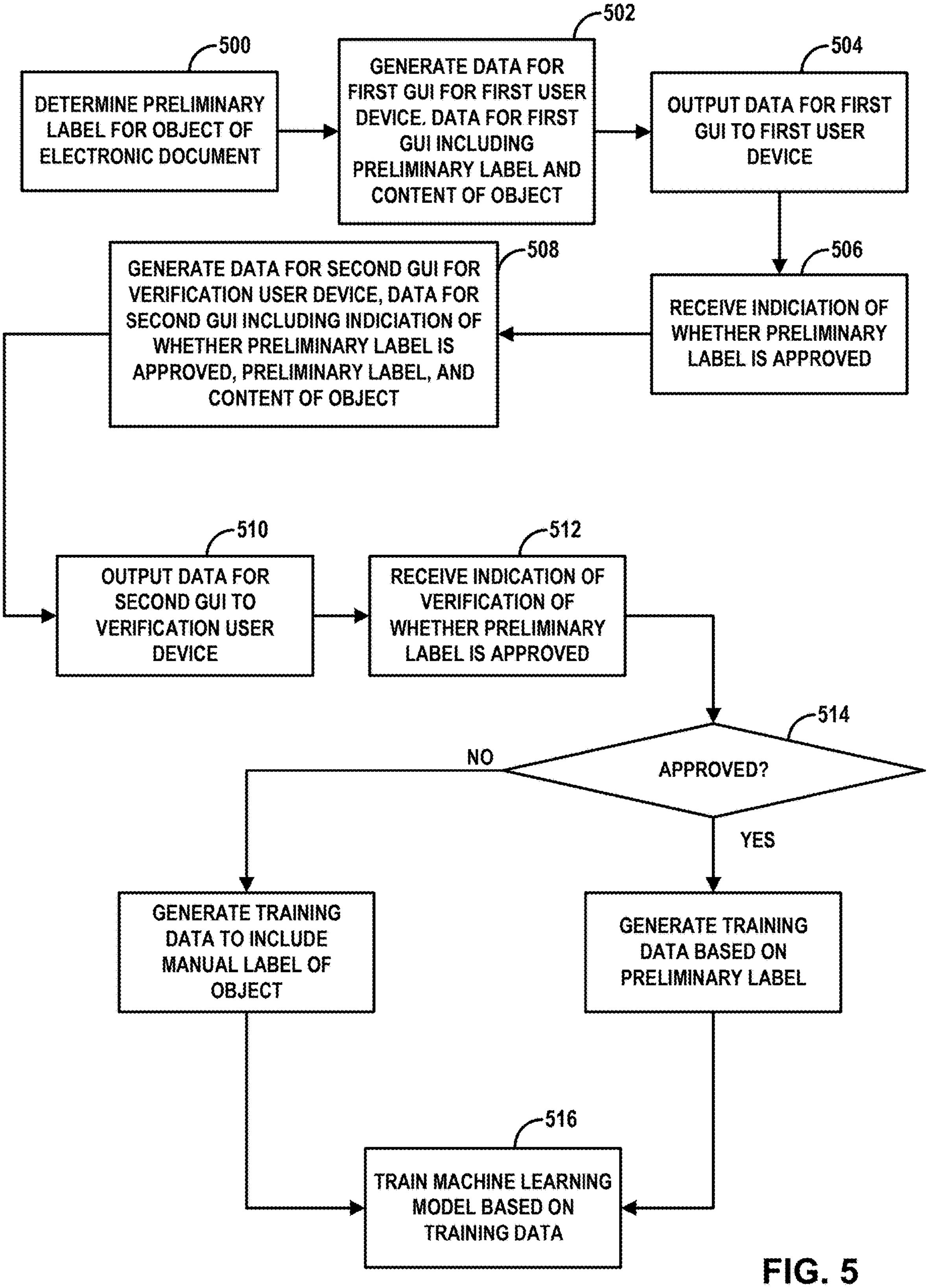
FIG. 5 is a conceptual diagram illustrating an example operation of generating training data based on automatically generated preliminary labels, in accordance with techniques of this disclosure.

FIG. 5 is a flow chart illustrating an example operation of generating training data based on automatically generated preliminary labels, in accordance with techniques of this disclosure. FIG. 5 may be discussed with respect to FIGS. 1 and 2 for example purposes only.

Preliminary label module 230 of document management platform 202 may determine a preliminary label for an object of an electronic document (500). The electronic document may be an electronic document included in a publicly available document data set (e.g., EDGAR), purchased documents, or the like. The electronic document may not include electronic documents that users interacting with document management platform 202 are accessing. For example, the electronic document may not include a working document that a user interacting with document management platform 202 is accessing. Preliminary label module 230 may output the preliminary label and content of the object to approval manager 224. Approval manager 224 of document management platform 202 may generate data for a first graphical user interface (GUI) for user device 108A, data for the first GUI including the preliminary label and the content of the object. (502). Approval manager 224 may output data for the first graphical user interface for user device 108A (504). For example, approval manage 224 may output data for the first graphical user interface in response to receiving a request from a user device to access a working document that is distinct from the electronic document. Approval manager 224 may cause the user device to output the data for the first graphical user interface as a pop-up that overlays data for the requested working document. Approval manager 224 may receive, from user device 108A, an indication of whether the preliminary label is approved (506). For example, approval manager 224 may receive the indication of whether the preliminary label is approved as data from user inputs of approval state selections 454 and/or manual label 464 of FIG. 4.

Approval manager 224 may generate data for a second GUI for user device 108N, data for the second GUI including the indication of whether the preliminary label is approved, the preliminary label, and the content of the object (508). Approval manager 224 may output the data for the second GUI to user device 108N (510). For example, approval manager 224 may output the data for the second GUI to user device 108N that is logged into a user account assigned a status associated with verifying approvals and/or disapprovals of preliminary labels. Approval manager 224 may receive, from user device 108N, an indication of verification of whether the preliminary label is approved (512). For example, a user of user device 108N may interact with the second GUI to select an option to accept or reject the indication of whether the preliminary label is approved that was received from the first user device.

Approval manager 224 may determine, based on the indication of verification of whether the preliminary label is approved, whether the preliminary label is approved (514). Based on the indication of whether the preliminary label has been verified specifying the preliminary label is verified and approved, approval manager 224 may send training data generator 226 an indication of the preliminary label and an indication of the object. Approval manager 224 may adjust, based on the indication of whether the preliminary label has been verified specifying the preliminary label is verified and approved, point values (e.g., add point values) to a user account associated with user device 108A that submitted the initial approval of the preliminary label. Approval manager may additionally or alternatively adjust, based on the indication of verification, point values to a user account associated with user device 108N. Approval manager 224 may generate approval state information for the preliminary label that indicates that the preliminary label is approved (e.g., an approval state information value of "1"). Training data generator 226 of document management platform 202 may generate, based on the approval state information of the preliminary label, training data based at least on the preliminary label (YES branch 514). In some instances, approval manager 224 may award points to a user account associated with a verified approval of a preliminary label. Approval manager 224 may award points to user accounts based on community data and approval state information including indications of user account identifiers that have submitted responses that make up the community data and approval state information. By implementing a verification procedure with a point value scheme for user accounts, document management platform 202 may ensure accuracy and user involvement to generate a large number of labels for electronic document objects.

Based on the indication of whether the preliminary label has been verified specifying the preliminary label is not verified, approval manager 224 may determine whether the indication includes any comments or manual labels (e.g., manual label 464 of FIG. 4) that were input by either the user device 108A or user device 108N. Approval manager 224 may adjust, based on the indication of whether the preliminary label has been verified specifying the preliminary label is not verified, point values (e.g., decrease point values) of a user account associated with user device 108A that submitted the initial approval of the preliminary label that has been rejected by user device 108N. Approval manager may additionally or alternatively adjust, based on the indication of verification, point values to a user account associated with user device 108N. Approval manager 224 may send any manual labels to training data generator 226. Approval manager 224 may generate approval state information based on the manual label indicating that the preliminary label is incorrect (e.g., approval state information stored as metadata in the preliminary label that includes a value of "0" and a string of text with the manual label). Training data generator 226 may generate, based on the approval state information associated with the preliminary label, training data to include the manual label for the object (NO branch 514). Training data generator 226 may determine the preliminary label as a label for the object and map the label to the object as a label-object pair included in a training data item. In some instances, training data generator 226 may include approval state information for labels mapped to objects as part of metadata of training data items generated by training data generator 226. Training data generator 226 may output and/or store the training data in training database 218. Training platform 220 of document management platform 202 may train any one of machine learning models 222 based on the automatically labeled training data stored in training database 218 (516).

Figure 6:
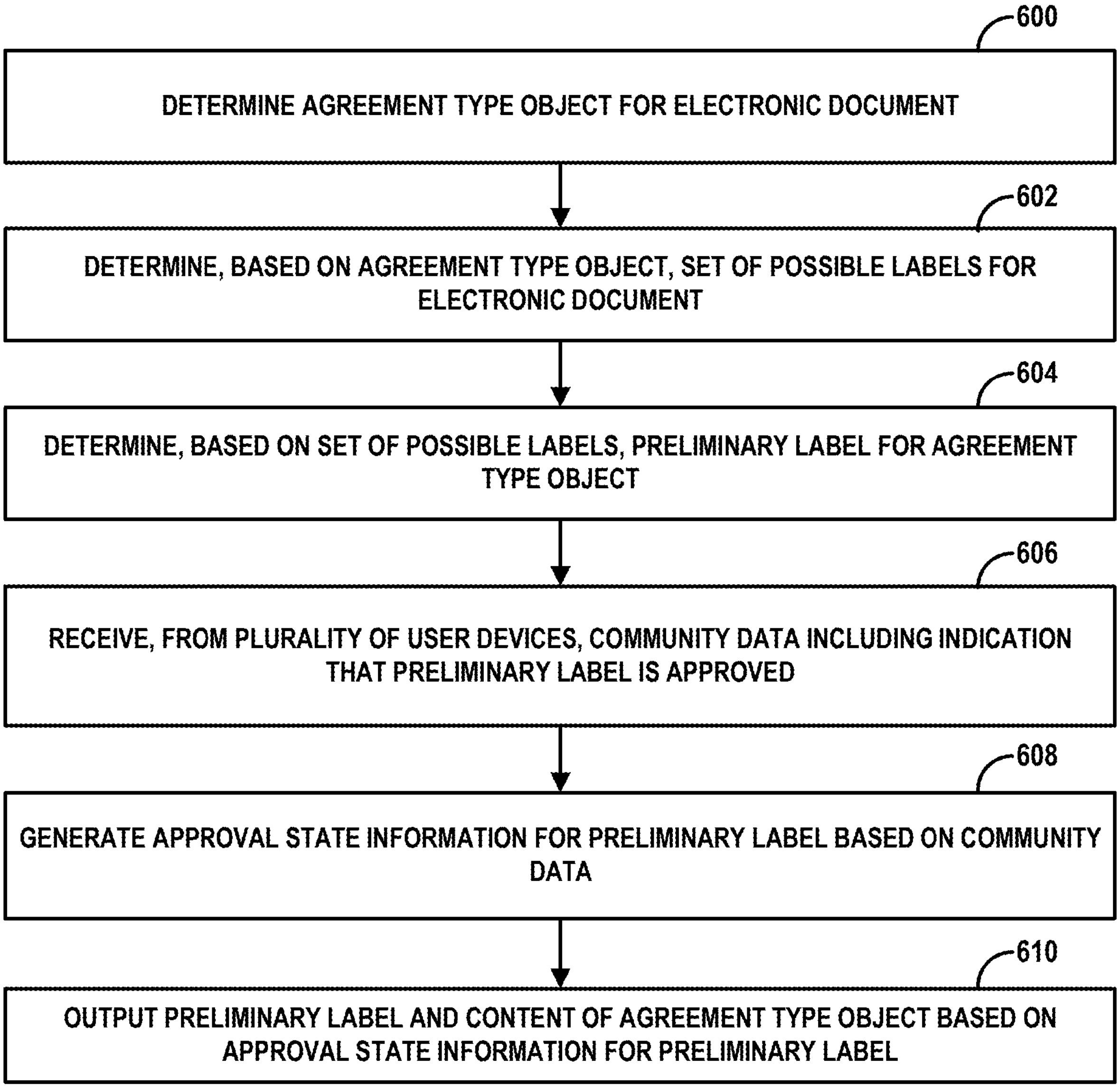
FIG. 6 is a flow chart illustrating an example operation for labeling electronic document objects, in accordance with techniques of this disclosure.

FIG. 6 is a flow chart illustrating an example operation for labeling electronic document objects, in accordance with techniques of this disclosure. FIG. 6 may be discussed with respect to FIG. 1 for example purposes only.

Document management platform 102 may determine an agreement type object for an electronic document (600). For example, document management platform 102 may process, using a large language model, an electronic document of document dataset 112 to determine document objects of the electronic document as portions or segments of the electronic document associated with different document characteristics or attributes. Document management platform 102 may determine an agreement type object as a data structure specifying a category (e.g., lease, master service agreement, statement of work, etc.) of agreement associated with the analyzed electronic document.

Document management platform 102 may determine, based on the agreement type object, a set of possible labels for the electronic document (602). Document management platform 102 may generate the set of possible labels based on processing the document using a large language model trained to identify characteristics associated with an agreement type specified in the agreement type object. For example, document management platform 102 may generate the set of possible labels using a large language model to output possible labels that may be determined for an agreement type of "lease," "master service agreement," "statement of work," or the like. In some instances, document management platform 102 may determine the set of possible labels based on document management functionality associated with any one of machine learning models 122. For example, document management platform 102 may determine the set of possible labels based on predefined labels for document management functionality of machine learning models 122, such as classifying document types, distinguishing agreements from supplemental documents, recognizing fields of a document, or the like.

Document management platform 102 may determine, based on the set of possible labels, a preliminary label for the agreement type object (604). Document management platform 102 may apply a large language model using a vector database to determine which possible label in the set of possible labels should be assigned to an object of the plurality of objects. For example, document management platform 102 may apply the large language model to determine a first preliminary label of "master service agreement" for an agreement type object of an electronic document.

Document management platform 102 may receive, from a plurality of user devices, community data including at least an indication that the preliminary label is approved (606). In some examples, document management platform 102 may receive community data as indications, received from user devices 108, of whether preliminary labels are approved or denied. For example, document management platform 102 may obtain an indication of whether a preliminary label is approved as data representing user inputs of approval state selection 454 and/or manual label 464 of FIG. 4. Document management platform 102 may receive community data that at least includes the indication of whether the preliminary label is approved.

Document management platform 102 may generate approval state information for the preliminary label based on the community data (608). For example, based on the indication of whether the preliminary label is approved specifying the preliminary label is approved, document management platform 102 may generate approval state information for the preliminary label specifying the preliminary label is approved or verified. For instance, document management platform 102 may generate approval state information to specify user inputs of approving or denying preliminary labels. Document management platform 102 may store the approval state information in metadata of the preliminary label that includes a value specifying an approval state of the preliminary label, such as an approval state value of null if no community data has been provided for the preliminary label, an approval state value of "0" with an optional manual label if community data indicates the preliminary label is incorrect, an approval state value of "1" if community data indicates the preliminary label is approved, and so on.

Document management platform 102 may output, based on the approval state information for the preliminary label, the preliminary label and content of the agreement type object (610). For example, document management platform 102 may output, based on the approval state information of a preliminary label indicating the preliminary label is approved, the first preliminary label and content of the agreement type object as a label-object pair to include in training data. Document management platform may generate the training data to include at least an indication of the preliminary label and an indication of the corresponding object. Document management platform 102 may store the training data in training database 118. Training platform 120 may access training database 118 of document management platform 102 to use the labeled training data of training database 118 to train machine learning models 122 to perform document management functionality, such as classifying documents, distinguishing content of documents, recognizing fields of documents, or the like.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing an understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A system for labeling objects of electronic documents using a plurality of user devices, the system comprising:

processing circuitry; and non-transitory computer-readable media comprising instructions that, when executed, cause the processing circuitry to:

determine an agreement type object for an electronic document;

determine, based on one or more mappings indicating possible labels assigned to agreement types of a plurality of agreement types, a set of possible labels for the electronic document;

map the agreement type object to a preliminary label from the set of possible labels;

receive, from the plurality of user devices, community data including at least an indication that the preliminary label is approved;

generate approval state information for the preliminary label based on the community data, the approval state information including a value corresponding to the indication that the preliminary label is approved and one or more hierarchical identifiers associated with the indication that the preliminary label is approved;

generate, based on the approval state information for the preliminary label and the agreement type object, model data to include at least an indication of the preliminary label and an indication of the agreement type object, wherein the model data includes an approval level for the preliminary label that is stored in the approval state information; and initiate, based at least on the model data, a modification of one or more models to perform electronic document management functionality.

2. The system of claim 1, wherein to determine the agreement type object, the instructions cause the processing circuitry to:

determine a context of the electronic document using a machine learning model; and partition, based on the context, the electronic document into a plurality of objects, the plurality of objects including the agreement type object.

3. The system of claim 2, wherein the instructions further cause the processing circuitry to fine-tune the machine learning model based on the indication that the preliminary label is approved.

4. The system of claim 2, wherein to map the agreement type object to the preliminary label, the instructions cause the processing circuitry to:

map, based on the context, the agreement type object to a cluster of a plurality of clusters, wherein each of the plurality of clusters correspond to a label included in the set of possible labels; and map the agreement type object to the preliminary label based on the mapping of the agreement type object to the cluster.

5. The system of claim 4, wherein the instructions further cause the processing circuitry to generate the plurality of clusters based on a plurality of embeddings stored at a vector database.

6. The system of claim 2, wherein the preliminary label is a first preliminary label, and wherein the approval state information is first approval state information, and wherein the plurality of objects includes a clause type object, and wherein the instructions further cause the processing circuitry to:

determine, based on the set of possible labels, a second preliminary label for the clause type object, wherein the community data received from the plurality of user devices further includes an indication that the second preliminary label is approved;

generate second approval state information for the second preliminary label based on the community data including the indication that the second preliminary label is approved; and output, based on the second approval state information for the second preliminary label, the second preliminary label and content of the clause type object.

7. The system of claim 1, wherein the electronic document is a first electronic document, and wherein to receive community data, the instructions cause the processing circuitry to, based on receiving a request for managing a second electronic document from a user device of the plurality of user devices:

generate data for a graphical user interface for the user device, the data for the graphical user interface including an indication of the preliminary label and an indication of content of the agreement type object; and output, to the user device, the data for the graphical user interface including the indication of the preliminary label and the indication of content of the agreement type object.

8. The system of claim 7, wherein the user device is a first user device, and wherein the graphical user interface is a first graphical user interface, and wherein the instructions further cause the processing circuitry to:

generate data for a second graphical user interface for a second user device of the plurality of user devices, the data for the second graphical user interface including the community data associated with the preliminary label, the indication of the preliminary label and the indication of the content of the agreement type object;

output, to the second user device, the data for the second graphical user interface including the indication of the preliminary label and the indication of the content of the agreement type object;

obtain an indication of whether the preliminary label has been verified, wherein the community data further includes the indication of whether the preliminary label has been verified;

update the approval state information based on the community data including the indication of whether the preliminary label has been verified and an indication of a user account associated with the second user device; and generate updated model data, the updated model data comprising at least the indication of the preliminary label, an indication of the agreement type object, and the updated approval state information.

9. The system of claim 8, wherein the instructions further cause the processing circuitry to:

determine an account status of the user account associated with the second user device; and select the second user device from the plurality of user devices based on a point value for the user account associated with the second user device.

10. The system of claim 1, wherein the instructions further cause the processing circuitry to adjust, based on the community data, a point value for a user account associated with the indication that the preliminary label is approved.

11. The system of claim 1, wherein the model data includes the indication of the preliminary label, the indication of content of the agreement type object, and an indication of a user account identifier associated with the community data used to generate the approval state information for the preliminary label.

12. The system of claim 1, wherein to generate the approval state information, the instructions cause the processing circuitry to:

identify, in the community data, the indication that the preliminary label is approved;

and store the approval state information as metadata of the preliminary label.

13. The system of claim 1, wherein the indication of the agreement type object includes one or more data structures specifying content of the agreement type object.

14. The system of claim 1, wherein the one or more mappings indicate the set of possible labels is assigned to an agreement type associated with the agreement type object.

15. The system of claim 1, wherein the approval level indicates a level of confidence associated with the preliminary label.

16. A method for labeling objects of electronic documents using a plurality of user devices, the method comprising:

determining, by processing circuitry, an agreement type object for an electronic document;

determining, by the processing circuitry, based on one or more mappings indicating possible labels assigned to agreement types of a plurality of agreement types, a set of possible labels for the electronic document;

mapping, by the processing circuitry, the agreement type object to a preliminary label from the set of possible labels;

receiving, by the processing circuitry, from the plurality of user devices, community data including at least an indication that the preliminary label is approved;

generating, by the processing circuitry, approval state information for the preliminary label based on the community data, the approval state information including a value corresponding to the indication that the preliminary label is approved and one or more hierarchical identifiers associated with the indication that the preliminary label is approved;

generating, by the processing circuitry, based on the approval state information for the preliminary label and the agreement type object, model data to include at least an indication of the preliminary label and an indication of the agreement type object, wherein the model data includes an approval level for the preliminary label that is stored in the approval state information; and initiating, by the processing circuitry, based at least on the model data, a modification of one or more models to perform electronic document management functionality.

17. The method of claim 16, wherein determining the agreement type object comprises:

determining a context of the electronic document using a machine learning model; and partitioning, based on the context, the electronic document into a plurality of objects, the plurality of objects including the agreement type object.

18. The method of claim 16, wherein the electronic document is a first electronic document, and wherein receiving the community data comprises:

based on receiving a request for managing a second electronic document from a user device of the plurality of user devices:

generating data for a graphical user interface for the user device, the data for the graphical user interface including an indication of the preliminary label and an indication of content of the agreement type object; and outputting, to the user device, the data for the graphical user interface including the indication of the preliminary label and the indication of content of the agreement type object.

19. Non-transitory computer-readable media encoded with instructions that, when executed, cause processing circuitry to:

determine an agreement type object for an electronic document;

determine, based on one or more mappings indicating possible labels assigned to agreement types of a plurality of agreement types, a set of possible labels for the electronic document;

map the agreement type object to a preliminary label from the set of possible labels;

receive, from a plurality of user devices, community data including at least an indication that the preliminary label is approved;

generate approval state information for the preliminary label based on the community data, the approval state information including a value corresponding to the indication that the preliminary label is approved and one or more hierarchical identifiers associated with the indication that the preliminary label is approved;

generate, based on the approval state information for the preliminary label and the agreement type object, model data to include at least an indication of the preliminary label and an indication of the agreement type object, wherein the model data includes an approval level for the preliminary label that is stored in the approval state information; and initiate, based at least on the model data, a modification of one or more models to perform electronic document management functionality.

20. The non-transitory computer-readable media of claim 19, wherein to generate the approval state information, the instructions cause the processing circuitry to:

identify, in the community data, the indication that the preliminary label is approved;

and store the approval state information as metadata of the preliminary label.

* * * * *